(12) United States Patent
Kameda et al.

(10) Patent No.: US 8,107,184 B2
(45) Date of Patent: Jan. 31, 2012

(54) OPERATION CONTROL APPARATUS, OPERATION CONTROL METHOD, OPERATION CONTROL PROGRAM CONTROLLING OPERATION OF MAGNETIC DISC DEVICE

(75) Inventors: Manabu Kameda, Kawagoe (JP);
Isamu Shinohara, Kawagoe (JP);
Daisuke Hirabayashi, Kawagoe (JP);
Kayoko Tsubota, Kawagoe (JP);
Takeshi Kobayashi, Wako (JP)

(73) Assignees: Pioneer Corporation, Tokyo (JP);
Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 12/671,977

(22) PCT Filed: Jan. 10, 2008

(86) PCT No.: PCT/JP2008/050179
§ 371 (c)(1),
(2), (4) Date: Feb. 3, 2010

(87) PCT Pub. No.: WO2009/087768
PCT Pub. Date: Jul. 16, 2009

(65) Prior Publication Data
US 2010/0284106 A1    Nov. 11, 2010

(51) Int. Cl.
*G11B 17/00* (2006.01)
(52) U.S. Cl. ....................................................... 360/69
(58) Field of Classification Search .................. None
See application file for complete search history.

(56) References Cited

U.S. PATENT DOCUMENTS

| | | | | |
|---|---|---|---|---|
| 5,825,581 A | * | 10/1998 | Morita et al. | 360/78.04 |
| 6,067,203 A | * | 5/2000 | Ottesen et al. | 360/73.03 |
| 6,151,183 A | * | 11/2000 | Ogasawara et al. | 360/75 |
| 7,079,348 B2 | * | 7/2006 | Ishii et al. | 360/75 |
| 7,492,543 B2 | * | 2/2009 | Mitsunaga et al. | 360/75 |
| 7,630,157 B1 | * | 12/2009 | Goeppner et al. | 360/60 |
| 2005/0096812 A1 | | 5/2005 | Nezu et al. | |
| 2007/0014547 A1 | | 1/2007 | Kasuya | |

FOREIGN PATENT DOCUMENTS

| | | |
|---|---|---|
| JP | 63-32395 | 3/1988 |
| JP | 1-85957 | 6/1989 |
| JP | 11-213525 | 8/1999 |
| JP | 2001-195813 | 7/2001 |
| JP | 2003-109293 | 4/2003 |
| JP | 2006-351136 | 12/2006 |
| JP | 2007-26620 | 2/2007 |
| JP | 2007-48424 | 2/2007 |
| JP | 2007-208864 | 8/2007 |
| WO | 2007/010644 | 1/2007 |
| WO | 2007/091497 | 8/2007 |

* cited by examiner

*Primary Examiner* — Kin C. Wong
(74) *Attorney, Agent, or Firm* — Drinker Biddle & Reath LLP

(57) ABSTRACT

For an apparatus determining whether or not an HDD is started by barometric pressure information or the like, there are provided a navigation apparatus, an operation control device, an operation control method, and an operation control program, that enable shortening of a time from a power-on to starting-up of the HDD.

The present application is the operation control device which controls the operation of the HDD by giving an instruction to the HDD to control the operation of the HDD, the operation control device including: a recording means for recording a previous closing information indicative of whether or not the operation of the operation control device normally ends by a previous power-off and an operation control means for giving an instruction of starting the operation to the HDD in a case where the operation has been normally ended at a time of starting the operation control device by the power-on.

8 Claims, 2 Drawing Sheets

OPERATION CONTROL APPARATUS, OPERATION CONTROL METHOD, OPERATION CONTROL PROGRAM CONTROLLING OPERATION OF MAGNETIC DISC DEVICE

FIELD OF THE INVENTION

The present invention relates to a technique of controlling operation of a magnetic disk device by instructing to the magnetic disc device having a magnetic disc and a magnetic head for writing and reading out information with respect to the magnetic disc while moving the magnetic head over the magnetic disc without being in contact therewith.

BACKGROUND OF THE INVENTION

As this kind of the magnetic disc device, there is known a hard disc drive (hereinafter referred to HDD). A magnetic head of the HDD floats over a layer of air that is produced by a kinetic pressure of the air caused by rotation of a magnetic disc, and is set up to read and write data in a state that the magnetic head is not directly in contact with the magnetic disc. However, because the HDD is configured to equalize an outer pressure value and an inner pressure value by means of a vent hole, the above kinetic pressure caused by barometric pressure (altitude) used changes and the magnetic head may be in contact with the magnetic disc.

Therefore, in a normal HDD, reliability is guaranteed in a warrantee range in which reliability is assured while preventing a magnetic head from being directly in contact with a magnetic disc on an entire area of the magnetic disc (barometric pressure generating a kinetic pressure bearable against impact and vibration caused during operation of the magnetic disc, for example, 0.6 atm (corresponding to an altitude of about 4,300 m) and 0.7 atm (corresponding to an altitude of about 3,000 m) when the temperature of HDD is 55 degree C. or more). For example, in a vehicle, a control device (hereinafter referred to as a vehicle control device) for controlling fuel injection is equipped in an in-vehicle navigation apparatus having an HDD equipped on it. For example, it is possible to stop operation of HDD to thereby protect the HDD in a case where a barometric pressure shown in barometric pressure information indicating a barometric pressure outside a vehicle and obtained from the vehicle control device via a controller-area-network (CAN). Although the barometric pressure is detected mainly to adjust injection amount of fuel, the barometric pressure information indicative of the barometric pressure may be obtained by the in-vehicle navigation apparatus via the CAN thereby reducing a number of parts composing of a barometric pressure sensor for detecting independently for the in-vehicle navigation apparatus.

In a related art, Patent Document 1, there is disclosed a technique of protecting an HDD in its entirety by stopping operation of the HDD under a shutdown state in a case where the HDD detects itself various environmental conditions of the HDD using various sensors and when environment specification is violated by eluding from a range of operable environment Patent Document 1: Japanese Unexamined Patent Publication No. Hei. 11-213525.

DISCLOSURE OF THE INVENTION

Problem to be Solved by the Invention

Meanwhile, it is necessary to read necessary data from an HDD for starting up various functions of an in-vehicle navigation apparatus by turning on an ACC power source of the vehicle. For this, it is necessary to turn on a starting switch for starting a vehicle control switch in order to obtain barometric pressure information from the vehicle control device. Accordingly, while the ACC power source is turned on and the starting switch is not turned on, because the barometric atom pressure is not obtained, it is impossible to start the HDD. On the other hand, if the barometric atom pressure is obtained after turning on the staring switch and the HDD is started, there is a problem that start of the HDD and start of various functions in the in-vehicle navigation apparatus are delayed.

The present invention is made to solve such the problems and to provide a navigation apparatus, an operation control apparatus, an operation control method, and an operation control program enabled to shorten a time from power-on to starting-up of an HDD in a system determining whether or not the HDD is allowed to start in consideration of barometric pressure information.

Means for Solving the Problem

To solve the above problem, according to claim 1 of the present invention, there is provided an operation control apparatus for controlling an operation of a magnetic disc device by instructing to a magnetic disc device having a magnetic disc and a magnetic head for writing and reading out information with respect to the magnetic disc while moving above the magnetic disc without contacting the magnetic disc, the operation control apparatus including: a recording means for recording previous end information indicative of whether or not end of the operation in the operation control apparatus by previously turning off the operation control apparatus, and an operation control means for giving an operation start instruction with respect to the magnetic disc device in a case of a normal end, determined at a time of starting operation of the operation control apparatus by power-on in reference of the previous end information.

According to Claim 7 of the present invention, there is provided an operation control method for controlling operation of a magnetic disc device by instructing to a magnetic disc device having a magnetic disc and a magnetic head for writing and reading out information with respect to the magnetic disc while moving above the magnetic disc without contacting the magnetic disc, the operation control method including: a recording step of recording previous end information indicative of whether or not end of the operation in the operation control apparatus by previously turning off the operation control apparatus, and an operation control step of giving an operation start instruction with respect to the magnetic disc device in a case of a normal end, determined at a time of starting operation of the operation control apparatus by power-on in reference of the previous end information.

According to Claim 8 of the present invention, there is provided an operation control program causing a computer to function, by providing an instruction to a magnetic disc device having a magnetic disc and a magnetic head for writing and reading out information with respect to the magnetic disc while moving above the magnetic disc without contacting the magnetic disc, to record previous end information indicative of whether or not end of the operation in the operation control apparatus by previously turning off the operation control apparatus, and to give an operation start instruction with respect to the magnetic disc device in a case of detecting a normal end by referring to the previous closing information, recorded at a time of starting the operation control apparatus by the power-on.

EXPLANATION OF NUMERICAL REFERENCES

1 GPS Receiving Unit
2 Sensor Unit
3 Communication Unit
4 HDD
5 Nonvolatile Memory
6 Display Unit
7 Phonetic Output Unit
8 Operation Unit
9 System Control Unit
10 System Bus
20 In-vehicle Bus
S In-vehicle Navigation Apparatus

THE BEST MODE FOR CARRYING OUT THE INVENTION

Hereinafter, embodiments of the present invention will be described in reference of figures. Here, the embodiments explained below are embodiments in a case where the present invention is applied to an in-vehicle Navigation Apparatus equipped in a vehicle.

First, in reference of FIG. 1, a structure and a function of the in-vehicle navigation apparatus according to the present embodiment will be described.

Figure 1:
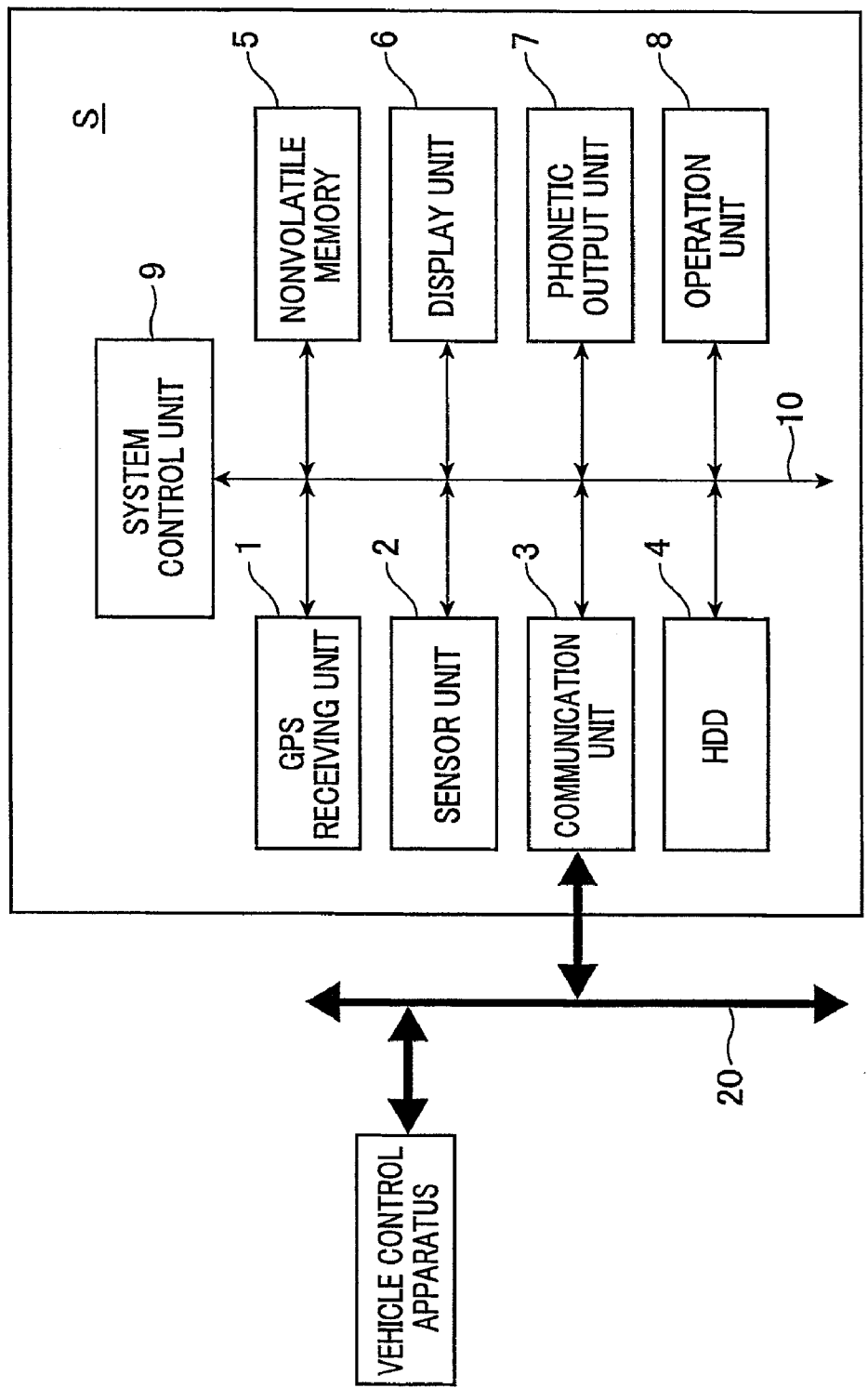
[FIG. 1] A view for showing aschematic structure of a navigation apparatus according to an embodiment of the present invention.

FIG. 1 is a view showing a schematic structure of the in-vehicle navigation apparatus according to the present embodiment.

As shown in FIG. 1, the in-vehicle navigation apparatus S is made up of a global positioning system (GPS) receiving unit 1, a sensor unit 2, a communication unit 3, an HDD 4 (an example of magnetic disc device), a nonvolatile memory 5 (an example of recording means), a display unit 6, a phonetic output unit 7, an operation unit 8, a system control unit 9 (an example of operation control unit) or the like, wherein each of the component parts are mutually connected through a system bus 10 so as to receive power supply from an ACC power source (not shown).

The GPS receiving unit 1 receives navigating electric wave outputted from a GPS satellite through a GPS antenna, measures it based on the received signal and outputs measured data (longitude, latitude and altitude information) to the system control unit 9.

The sensor unit 2 has various sensors for example a speed sensor for detecting a vehicle speed based on a vehicle speed pulse and outputs various data detected by these sensors to the system control unit 9.

The communication unit 3 is connected to an in-vehicle bus (for example, CAN) 20. It is possible to receive various information from various sensors and machines which are connected to the in-vehicle bus 20. The received information is outputted to the system control unit 9. In the present embodiment, barometric pressure information indicative of barometric pressure detected by a vehicle control apparatus equipped in a vehicle (a detecting apparatus for detecting a barometric pressure) is receivable by a communication unit 3 through an in-vehicle bus 20. Although not shown, HDD 4 is made up of a hard disc (magnetic disc), a magnetic head, an actuator, a spindle motor, a servo control unit, a thermo sensor, and a data processing unit or the like. The hard disc has an information recording area (recording surface) in a ring-like shape where a large number of data tracks are concentrically arranged. The information recording area has navigation data and a program (the operation control program according to the present invention) necessary for a navigation process. In the navigation process, there are included a map display process for displaying for example a map around a current position of the vehicle, a route searching process for searching a most suitable route to a destination (destination set up by a user), a route guiding process for guiding the route (for example the most suitable route) to the destination. Further, the navigation data include for example map data and various set-up data and so on.

A hard disc is rotated and activated by a spindle motor. The actuator has a voice coil motor as a source of driving the actuator and rotated by the voice coil motor. Further, the servo control unit is driven and controlled by the spindle motor and the voice coil motor under a control of the system control unit 9.

The magnetic head is used to write or read out information to or from the hard disc. The magnetic head is attached to a tip end of the actuator to thereby move in a radius direction of the actuator along with rotation (angular rotation) of the actuator above the hard disc without contact with the hard disc. Further, the magnetic head is connected to the data processing unit. Further, the magnetic head is connected to the data processing unit to thereby enable amplification of the signal related to information read out by the magnetic head in the data processing unit, a predetermined decode process and so on. Thereafter, for example, the signal is outputted to the system control unit 9. Meanwhile, the signal related to the information to be written on the hard disc is inputted from for example the system control unit 9 to the data processing unit. After a predetermined encoding process is carried out, the signal is written on a predetermined information recording area (a target track position designated by the system control unit 9) on the hard disc by the magnetic head. Further, the temperature sensor is provided inside the HDD 4 to thereby detect a temperature inside the HDD 4.

The nonvolatile memory 5 is made of for example a Flash EPROM (Erasable Programmable Read Only Memory) or the like and is possible to record a previous closing information indicative of whether or not the operation of the in-vehicle navigation apparatus S normally ends by the previous cutoff of the ACC power source.

The display unit 6 is provided with, for example, a depiction processing unit, a buffer memory, a display and so on. After the depiction processing unit expands the map data and so on on the buffer memory and draws an image under a control of the system control unit 9, the image is displayed on a screen of the display.

The sound output unit 7 has for example a digital/analogue signal converter (DAC), an amplifier, a speaker and so on. After the DAC converts a data under voice related to guidance for driving, outputted from the system control unit 9, from digital to analogue, the data under voice are amplified by the amplifier and outputted from the speaker.

The operation unit 8 has a plurality of instruction buttons (operation buttons) to accept various instructions from a user and outputs instruction signals corresponding to the instruction buttons pushed by the user to the system control unit 9.

The system control unit 9 has a CPU having a calculating function, a working RAM, and ROMs for memorizing various data and programs and totally controls structural elements of the navigation apparatus S. The system control unit 9 functions as an operation control unit and so on of the present invention by making the CPU read a program (including operation control program according to the present invention) recorded on a hard disc of for example the HDD 4, controls operation of the HDD 4 by instructing the HDD 4, and simultaneously carries out a navigation process in use of the navigation data.

More specifically, the system control unit 9 as an operation control means refers to the previous closing information recorded in the nonvolatile memory 5 when the in-vehicle navigation apparatus S starts its operation (activation) by turning on the ACC power source. In a case where the in-vehicle navigation apparatus S normally ends, i.e. operation of the in-vehicle navigation apparatus S normally ends in the previous turning-off of the ACC power source, the system control unit 9 gives an instruction of starting operation in the HDD 4. The servo control unit of the HDD 4 receiving such the instruction of starting the operation makes the spindle motor start (initiate rotation) thereby starting up the HDD 4. Meanwhile, the system control unit 9 refers to the previous closing information memorized in the nonvolatile memory 5. When it does not normally end, barometric pressure information indicative of a barometric pressure at a present position (barometric pressure information indicative of a barometric pressure detected by the vehicle control apparatus) is acquired through an in-vehicle bus 20 and a communication unit 3. In a case where the barometric pressure indicated by the barometric pressure information thus acquired is normal, an operation starting instruction is given to the HDD 4.

Here, it is determined whether or not the barometric pressure is normal by whether or not it is for example 0.6 atm (threshold barometric pressure) or more, namely when it is 0.6 atm or more the normal pressure is determined. Further, the system control unit 9 may have a structure such that temperature information indicative of an inner temperature is acquired from the temperature sensor and it is determined whether or not the normal barometric temperature exists base on the barometric pressure information and the temperature information. For example, in a case where the temperature indicated in the temperature information is the threshold temperature or more (for example 55 degree C.), the threshold barometric pressure is raised and it is determined to be the normal pressure in a case where the barometric pressure indicated in the barometric pressure information is form example higher than for example 0.7 atm.

Further, the normal end means a state that it is judged to be for example a normal barometric pressure and the navigation apparatus S ends by turning off the ACC power source (a normal barometric pressure at the previous end time). In a case where a present barometric pressure is a normal barometric pressure (for example, in a state that it is judged to be the normal barometric pressure) at a time of ending the operation by turning off the ACC electric power, the previous closing information indicative of the end of operation is recorded in the nonvolatile memory 5, and in a case where the present barometric pressure is not the barometric normal pressure (abnormal barometric pressure) the previous closing information indicating that the operation has not normally ended is recorded in the nonvolatile memory 5.

Further, after the system control unit 9 gives an operation start instruction to the HDD 4, it acquires the barometric pressure information indicative of the barometric pressure through the in-vehicle bus 20 and the communication unit 3 (for example periodical acquisitions). In a case where the barometric pressure indicated by the barometric pressure information is not the normal barometric pressure, an instruction of stopping the operation is given to the HDD 4. The servo control unit of the HDD 4 which receives such the instruction of stopping the operation makes the spindle motor stop thereby stopping the HDD 4 to be in a protected state.

First, in reference of FIG. 2, an operation of the in-vehicle navigation apparatus S according to the present embodiment will be described.

Figure 2:
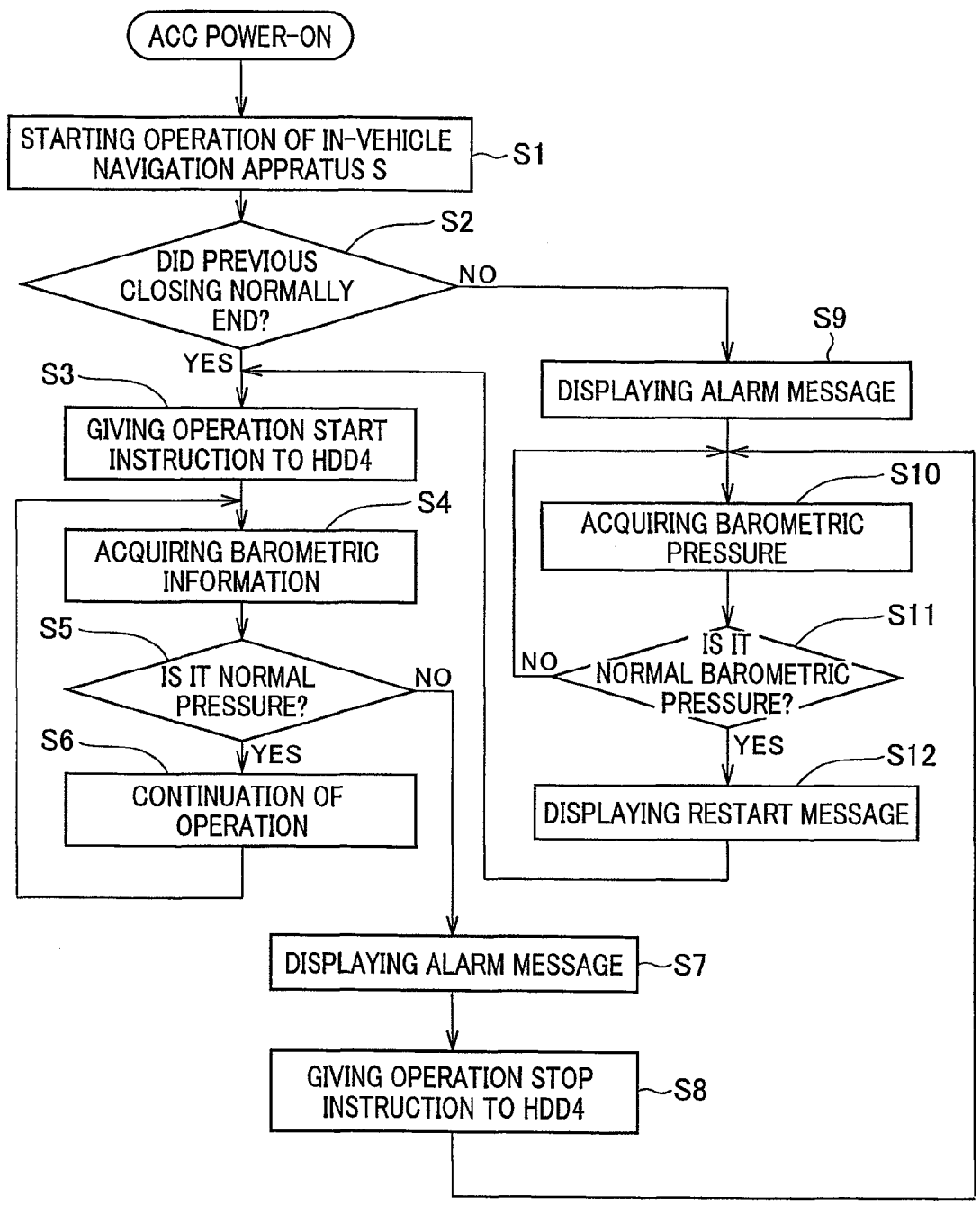
[FIG. 2] A flow chart showing an example of a process in a system control unit 9.

FIG. 2 is a flow chart showing an example of a process in the system control unit 9.

In FIG. 2, when the ACC power source is turned on, operation of the in-vehicle navigation apparatus S is started by the system control unit 9 (Step 1). At this time, the spindle motor in the HDD 4 is in a stopped state.

Next, the system control unit 9 acquires temperature information indicative of a temperature inside the HDD 4 from a temperature sensor, simultaneously refers to the previous closing information after reading out from the nonvolatile memory 5, determines whether or not it is the normal end (whether or not a flag indicative of the normal end (Step S2). In a case where it is the normal end (Step S2: YES), the operation starting instruction is given to the HDD 4 (Step S3). By this the spindle motor in the HDD 4 starts.

The system control unit 9 acquires the barometric pressure information indicative of the barometric pressure from the vehicle control apparatus through the in-vehicle bus 20 and the communication unit 3 in a case where the ignition is turned on (Step 4), and judges whether or not the barometric pressure indicated by the barometric pressure information thus acquired is the normal barometric pressure (Step S5). As described above, in a case where it is judged to be the normal temperature based on the barometric pressure information and the temperature information, the temperature information acquired in Step 1 is referred to (similar in Step S11).

In a case of the normal barometric pressure (Step S5: YES), the operation is continued (Step S6) and the process goes back to Step S5. On the other hand, in a case of not being the normal barometric pressure (abnormal barometric pressure out of the assurance) (Step S5: NO), the system control unit 9 makes the display unit 6 display an alert message indicative of an abnormal barometric pressure on the display unit 6 (Step S7), gives the instruction of stopping the operation to the HDD 4 (Step S8), and goes to Step S10. By this operation stop instruction, the spindle motor of the HDD 4 stops and the HDD 4 is in the protected state.

On the other hand, in a case where it is judged to be the abnormal state in the above step S2 (Step S2: NO), the alarm message indicative of not being the normal end (abnormal end) is displayed in the display unit 6 (Step S9).

In the next, the system control unit 9 acquires the barometric pressure information indicative of the barometric pressure from the vehicle control apparatus through the in-vehicle bus 20 and the communication unit 3 when the ignition is turned on (Step S10). It is judged whether or not the barometric pressure indicated in the barometric pressure information thus acquired is the normal pressure or not (Step S11). In a case where it is the normal barometric pressure (Step S11: YES), the system control unit 9 restarts a restart message on the display unit 6 (Step S12). Then the process moves to Step S3 and the process described above is done in a manner similar thereto. On the other hand, when it is not the normal barometric pressure (Step S11: NO), the system control unit 9 maintains the operation stopping state of the HDD 4 and goes back to Step S10, wherein the process is repeated until the normal pressure is obtained.

After providing the operation stop instruction to the HDD 4 in Step S8, in the judgment whether or not it is the normal barometric pressure carried out in Step S10 through Step S11 after receiving the operation stop instruction with respect to the HDD 4 in Step S11, it is possible to construct such that a threshold barometric pressure (a threshold barometric pressure for reversion) is raised. For example, in a case where the barometric pressure is higher than 0.71 atm or the barometric pressure is higher than 0.61 atm and the temperature is less than 50 degree C., it is judged that the normal barometric pressure is reverted.

Further, in the process of FIG. 2, when there is provided the instruction of turning off the ACC power source (for example, the user operates the operation unit 8 to input the instruction of turning off the AC power source), the system control unit 8 records the previous closing information indicating that the operation has normally ended in a case where the barometric pressure indicated by the barometric pressure information obtained immediately before is a normal barometric pressure. Meanwhile, in a case where the barometric pressure is not the normal barometric pressure, the previous closing information indicative of the operation end is not normal is recorded in the nonvolatile memory 5. Then the process ends.

As described above, according to the above embodiment, the previous closing information recorded in the nonvolatile memory is referred to at a time of starting operation of the in-vehicle navigation apparatus S by power-on. In a case of the normal end, the operation stating instruction is given to the HDD 4, and in case of not being the normal end, the barometric pressure information indicative of the barometric pressure at the present position is acquired. Because it is configured such that the instruction of starting operation is given to the HDD 4, it is possible to properly protect the HDD 4 while shortening a time from power-on to start-up of the HDD 4 (escaping from delay of the start-up of various functions in the in-vehicle navigation apparatus S)

Next, a countermeasure to the case where the vehicle control apparatus cannot detect a barometric pressure in the above embodiment will be described. Further, it is possible to mention for example vibration, impact, temperature, humidity and condensation as the factor that the vehicle control apparatus cannot detect the barometric pressure.

In a case where the vehicle control apparatus cannot detect the barometric pressure, it is possible to make the barometric pressure indicative of an identical fixed value (for example, 1 atm (760 mmHg)) being kept outputting from the vehicle control apparatus. For example, the barometric pressure indicated by the barometric pressure information thus acquired is changed from an abnormal barometric pressure (for example, 0.7 atm (532 mmHg) or less) to one atm. Thereafter, in a case where the system control unit 9 recognizes that the one atm is constant, for example the barometric pressure information indicative of the one atm is obtained a plurality of consecutive times (five times), it is judged that the barometric pressure cannot be detected and it is configured that the barometric pressure cannot be detected and the process under the abnormal barometric pressure is carried out (for example, continuation of the protected state of the HDD 4). Meanwhile, for example, in a case where it is recognized that the normal barometric pressure is suddenly changed from the normal pressure to one atm and thereafter the system control unit 9 recognizes a case where the barometric pressure indicated in the barometric pressure information thus obtained is constantly one atm (namely, the vehicle control apparatus is in a state that the barometric pressure cannot be detected) and the barometric pressure indicated by the barometric pressure information obtained immediately before the constant one atm, it is configured that the HDD 4 is continuously operated without giving an instruction of stopping operation to the HDD 4. According to such the structure, it is possible to properly deal with a case where the vehicle control apparatus cannot detect the barometric pressure. Meanwhile, during the barometric pressure information indicative of one atm is kept being outputted because the barometric pressure cannot be detected, the ACC power is off and thereafter the barometric pressure information indicative of the barometric pressure outputted when the Acc power is on is set up to be for example a lowest limit value (e.g. 91.4 mmHg), it is judged that to be not a normal end in Step S2 and is possible to display an alarm message indicative of not being the normal end can be displayed on the display unit 6 without giving an operation start instruction to the HDD 4. Without limiting to dealing with the case where the vehicle control apparatus cannot detect by recognizing the continuous output of the barometric pressure information indicative of the identical fixed value, it is also possible to deal with the case where the vehicle control apparatus cannot detect the barometric pressure in a case where a variation between the barometric pressure indicated by the barometric pressure information previously acquired and the barometric pressure indicated by the barometric pressure information currently acquired is a predetermined value or more. Namely, provided that the predetermined value is 0.3 atm, in a case where the barometric pressure indicated in the barometric pressure information previously acquired is 0.7 atm and the barometric pressure indicated in the barometric pressure information currently acquired is 1.0 atm, the variation is 0.3 atm. Then it is determined the variation is the predetermined value or more and the above countermeasure for the abnormal barometric pressure can be carried out.

Meanwhile, in the above embodiment, the normal end is a state that the navigation apparatus S ends under the normal barometric pressure by turning off the ACC power. As another example, an altitude may be detected by the GPS receiving unit 1 instead of using the barometric pressure and the normal end may be defined as end of the navigation apparatus S by ACC power-off under a normal altitude (e.g. about 4,300 m or less (3,000 m or less in an HDD temperature of 55 degree C. or more)).

Further, in the embodiment, the system control unit 9 is exemplified as an operation control means of the present invention. However, the present invention is not limited thereto, and the servo control unit in the HDD 4 may be configured to function as the operation control unit according to the present invention. In this case, in a manner similar to the above system control unit 9, the servo control unit in the HDD 4 refers to the previous closing information recorded in the nonvolatile memory 5 (which may exist in the HDD 4) at a time of starting the in-vehicle navigation apparatus S by ACC power-on. In a case where it is the normal end, the operation start command is given to the HDD 4 (here, the spindle motor). In case of not being the normal end, the barometric pressure indicative of the current position is acquired, and when the barometric pressure is the normal barometric pressure the operation start command is given to the spindle motor.

Further, in the embodiment, the example that the present invention is applied to the navigation apparatus equipped in the vehicle is exemplified. However, the present invention is not limited thereto. For example, the present invention can be applied to a communication navigation apparatus configured by a communication navigation terminal and a communication center apparatus connected through an antenna and a mobile communication network (including a radio base station and so on) to the communication navigation terminal.

Further, the present invention is applicable to other electronic apparatuses equipped in a vehicle and having an HDD.

Further, although the navigation apparatus equipped in the vehicle is exemplified, the present invention is not limited thereto and also applicable to, for example, a mobile phone, a PHS, a PDA, and so on having an HDD in it.

Further, in the embodiment, although it has been explained about a case where the HDD is used as the magnetic disc, another apparatus having a magnetic disc and a magnetic head provided to write in and read out information from and into the magnetic disc while moving over the magnetic disc without being in contact with the magnetic disc.

The invention claimed is:

1. An operation control apparatus controlling an operation of a magnetic disc device having a magnetic disc and a magnetic head for writing or reading information in or out the magnetic disc while moving over the magnetic disc without being in contact with the magnetic disc by giving an operation start instruction to the magnetic disc device, the magnetic disc device being provided with a guarantee range of assuring reliability of operation with respect to a state of barometric pressure comprising:
    a recording device that records a previous closing information indicative of whether or not the operation control apparatus ends when a previous power-off of the magnetic disc device is executed under a state of normal barometric pressure within the guarantee range of assuring operation of the magnetic disc device; and
    an operation control device that gives the operation start instruction to the magnetic disc device in a case where the operation ends under the normal barometric pressure, irrespective of a state of a barometric pressure at a time of a power-on of the magnetic disc device after the power-off, in reference of the previous closing information thus recorded at a time of starting the operation of the operation control apparatus by the power-on after the power-off.

2. The operation control apparatus according to claim 1, wherein
    the operation control device acquires barometric pressure information indicative of the barometric pressure at a current position in a case where the operation did not end under the state of the normal barometric pressure, and gives the operation start instruction with respect to the magnetic disc device in a case where the barometric pressure indicated by the barometric pressure information thus acquired is the normal barometric pressure.

3. The operation control device according to claim 1, wherein
    the operation control device gives the operation start instruction to the magnetic disc device and thereafter acquires barometric pressure information indicative of the barometric pressure at a current position, and
    in a case where the barometric pressure information thus acquired does not indicate the normal barometric pressure, the operation control device gives an operation stop instruction to the magnetic disc device.

4. The operation control apparatus according to claim 1, wherein
    the operation control device acquires barometric pressure information indicative of the barometric pressure at a current position after giving the operation start instruction to the magnetic disc device, and
    in a case where the barometric pressure indicated by the barometric pressure information thus acquired is a barometric pressure showing abnormality of a detection apparatus for detecting the current position, the magnetic disc device continues operation without the operation stop instruction when the barometric pressure acquired immediately before acquiring the barometric pressure is normal.

5. The operation control apparatus according to claim 1, wherein
    the recording device records the previous closing information indicating that ending of the operation is carried out in a state of the normal barometric pressure in a case where the current barometric pressure is a normal pressure at a time of ending the operation by the power-off.

6. A navigation apparatus having the magnetic disc device and the operation control apparatus according to claim 1, wherein
    the magnetic disc records navigation data necessary for navigation process including a route guide process for guiding a route to a destination, and
    the operation control apparatus carries out the navigation process using the navigation data.

7. An operation control method controlling operation of a magnetic disc device having a magnetic disc and a magnetic head for writing or reading information in or out the magnetic disc while moving over the magnetic disc without being in contact with the magnetic disc by giving an operation start instruction to the magnetic disc device, the magnetic disc device being provided with a guarantee range of assuring reliability of operation with respect to a state of barometric pressure comprising:
    a step of recording previous closing information indicative of whether or not the operation control apparatus ends when a previous power-off of the magnetic disc device is executed under a state of a normal barometric pressure within the guarantee range of assuring operation of the magnetic disc device; and
    a step of giving an operation start instruction to the magnetic disc device in a case where the operation ends under the normal barometric pressure, irrespective of a state of a barometric pressure at a time of a power-on of the magnetic disc device after the power-off, in reference of the previous closing information thus recorded at a time of starting the operation of the operation control apparatus by the power-on after the power-off.

8. A non-transitory computer-readable storage medium that stores a computer-executable program for controlling an operation of a magnetic disc device having a magnetic disc and a magnetic head for writing or reading information in or out the magnetic disc while moving over the magnetic disc without being in contact with the magnetic disc by giving an operation start instruction to the magnetic disc device, the magnetic disc device being provided with a guarantee range of assuring reliability of operation with respect to a state of barometric pressure, the program causing a computer to perform steps comprising:
    a step of recording a previous closing information indicative of whether or not the operation control apparatus ends when a previous power-off of the magnetic disc device is executed under a state of a normal barometric pressure within the guarantee range of assuring operation of the magnetic disc device, and
    a step of giving an operation start instruction to the magnetic disc device in a case where the operation ends under the normal barometric pressure, irrespective of a state of a barometric pressure at the time of a power-on of the magnetic disc device after the power-off in reference of the previous closing information thus recorded at a time of starting the operation control apparatus by the power-on after the power-off.

* * * * *